April 25, 1944. J. H. LAWLOR ET AL 2,347,488
OPTICAL LENS
Filed April 5, 1943 2 Sheets-Sheet 1
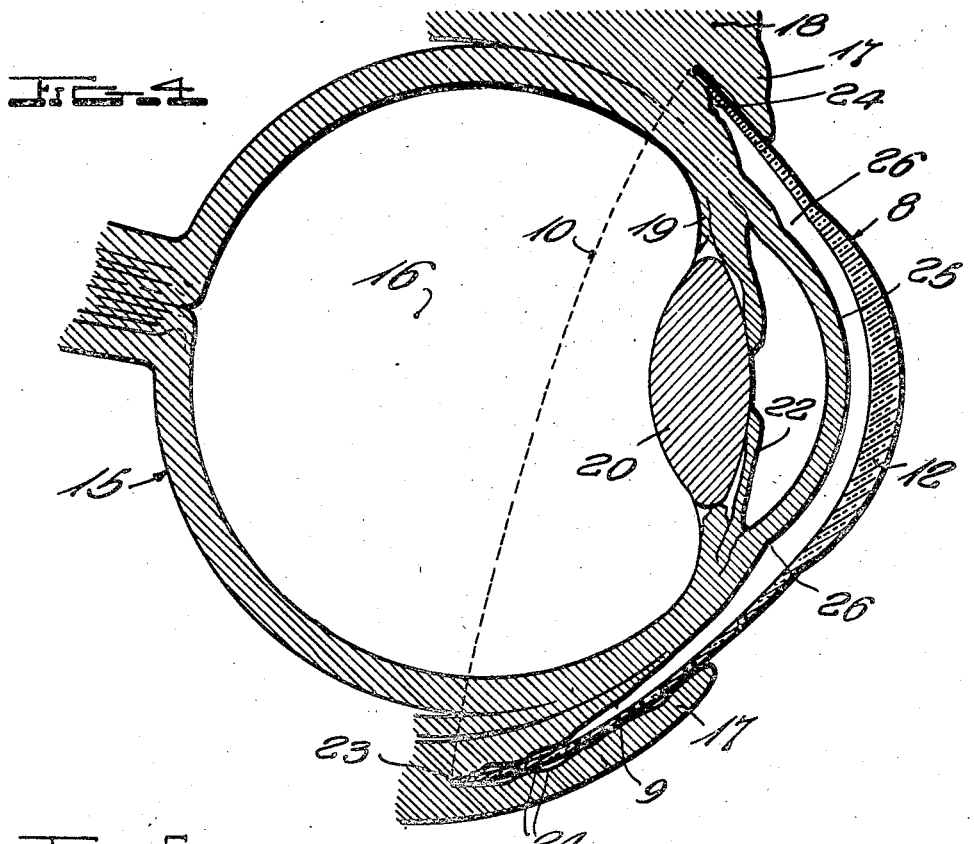
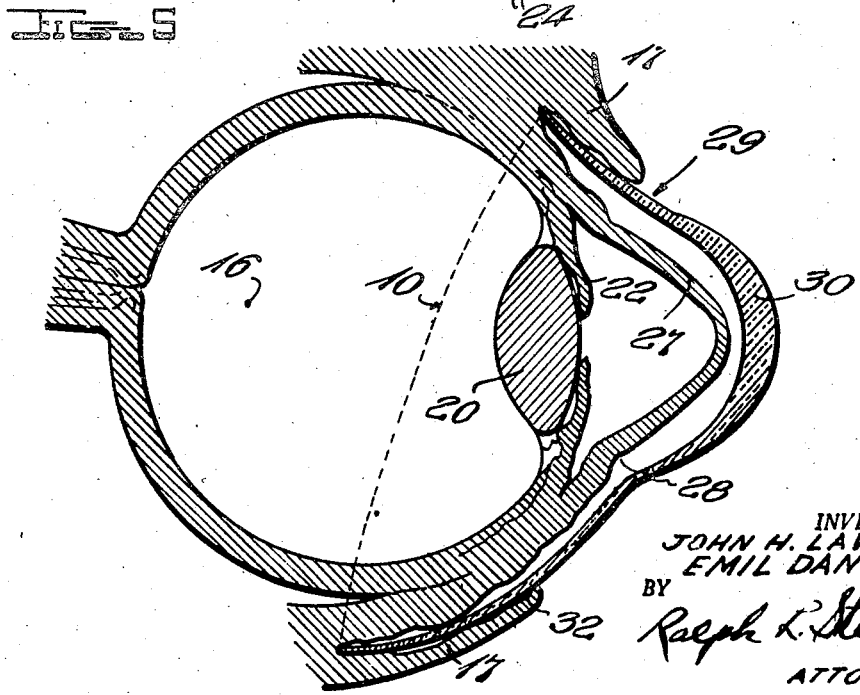
INVENTORS
JOHN H. LAWLOR
EMIL DANZ
BY Ralph L. Stevens
ATTORNEY

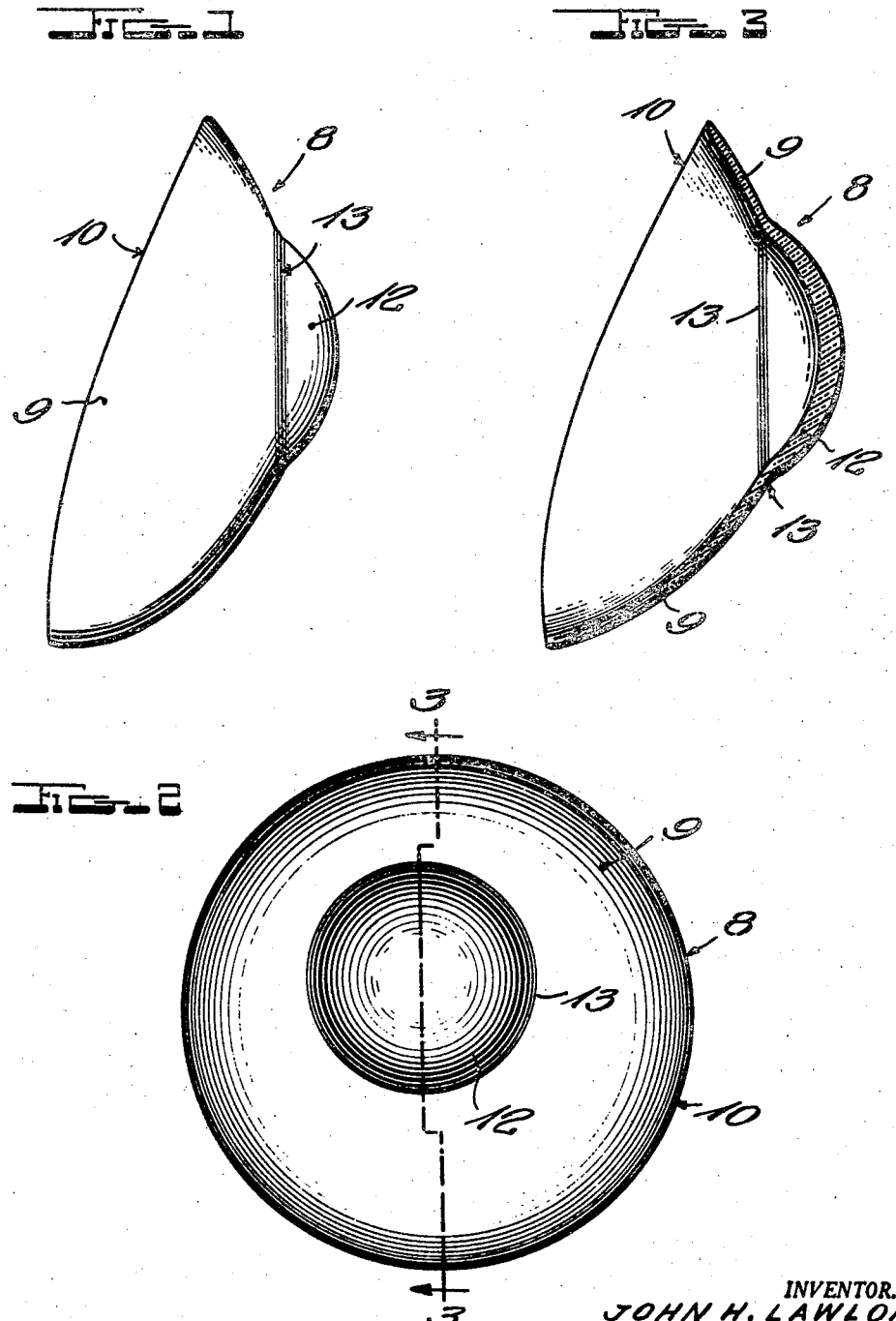

Patented Apr. 25, 1944

2,347,488

UNITED STATES PATENT OFFICE 2,347,488

OPTICAL LENS

John H. Lawlor, New York, and Emil Danz, Flushing, N. Y.

Application April 5, 1943, Serial No. 481,898

9 Claims. (Cl. 88—54.5)

This invention relates to optical lenses of the type supported directly by the eye structure, rather than by frames mounted upon other parts of the head. In this sense our invention may be said to belong in the class of "internal" or "contact" lenses.

However, all contact lenses of which we are aware have been so called because of direct supporting contact with the eyeball, whereas the improved lens of the present invention is internally elevated and makes no such contact. Our improved lens is supported by the adnexa eye structure and is spaced forwardly in its entirety from the eyeball, thus representing something entirely new in optical lenses.

This invention comprises the successful results of a series of efforts made to restore the vision of a person whose sight had been seriously impaired and whose eyes, considered as physical organs, had been injured structurally, through use of the ordinary "contact" lenses, fairly well known to the public by such name. Because of a rather unusual corneal condition, his vision could not be aided materially with the old type spectacles since their frames could not be utilized to mount each lens sufficiently close to the cornea of the eyeball.

The primary object of the present invention, therefore, is to devise an internal lens that may be supported without contact with the eyeball and particularly without contact with the cornea. This is accomplished by imparting to the lens a unique shape that is, roughly, semi-spherical but of a diameter greater than that of the eyeball, and then supporting the rim of this lens in the surrounding fornix conjunctivae.

The word "lens" is used here and in the claims to define the internally inserted eye-piece in its entirety, but it will be understood that only that portion disposed directly in front of the crystalline lens of the eyeball need be designed to have optical properties for correction of imperfect vision.

The earlier true form of contact lens in general use today adhering directly to the eyeball either in line or surface contact and supported thereby, may in certain cases have a tendency to oppress the corneal circulation of lymph nutrition with resultant edema in cornea tissues with clouding and inflamation. Aside from possible irritation caused by frictional contact, forces of tension and pressure may tend to distort the corneal portion of the eyeball so that the limbus and canal of Schlemm may congest and fail to function properly.

Therefore, it is a major object of the present invention to devise an internal lens having: base or rim particularly designed to rest in the conjunctival membranes of the eye-socket for support substantially entirely thereby; a sidewall or skirt that fully clears the limbus and all other adjacent parts of the cornea and that substantially clears the sclera; and an optically corrected frontal portion, or lens proper, disposed in front of the iris without contact with any part of the cornea.

The lens of this invention can be worn all day and at night without discomfort, although it is preferable to remove it occasionally to change the used solution and thus eliminate the normal eye secretions that have passed into the used liquid. A fresh emollient solution is beneficial at intervals to any eyeball. Due to the shape and depth of the lens, which can be filled and applied much in the manner of the conventional eye-cup, the lens can be easily placed in the eye without the introduction of air bubbles, since some liquid is spilled over the rim as the eyeball is received by the "cup." The head is nodded downwardly to face the floor during this manipulation with the fingers so that any air bubbles rise to the top (the rim) of the lens and hence escape with the liquid that overflows the rim.

The rim of the cup-shaped lens, being smooth, does not irritate the superior and inferior membranes of the conjunctivae fornix. In fact these membranes are formed of a somewhat "fatty" tissue that can be stretched without deleterious result, so that the rim of the lens preferably is intentionally made oversized to stretch the conjunctivae fornix both diametrically and rearwardly to a very slight extent, thus to effectively seal the clearance space between the eyeball and the interior surface of the lens. Hence, it may be said that the rim of the lens has a contour closely approximating that of the so-called "circular" conjunctivae fornix of the socket of the particular eye to which it has been prescribed after careful examination.

Further advantages of the mounting just described are that it definitely fixes the lens in one maintained position so that the lens proper is always disposed accurately in front of the pupil; and that it permits the eyeball to move without tendency to displace the lens, although it might be more accurate to say that independent movement of the eyeball is due to the clearance which eliminates rubbing contact with the lens. In some abnormal or pathological conditions of the cornea, the cornea may protrude greatly, but even so, the lens proper is made sufficiently large and deep to receive the enlarged cornea and permit it to roll without contact.

Most of the important objects of the invention are expressed above, but further objects and advantages will appear as the description proceeds with reference to the accompanying drawings. In the drawings:

Fig. 1 is a top plan view of a preferred embodiment of the present invention, seen in about the position it assumes in the right eye of the wearer.

Fig. 2 is a rear elevational view, as seen when looking directly into the back of the lens.

Fig. 3 represents a section taken substantially upon the plane of line 3—3, Fig. 2.

Fig. 4 is a section taken horizontally through an entire normal, "right" eyeball and portions of its adjacent lower eyelid, with the lens of Figs. 1 to 3 applied.

Fig. 5 is a similar view on a smaller scale showing the lens sufficiently modified for proper application to a right eye having an abnormal corneal condition.

A lens for the left eye of the wearer obviously would be illustrated reversely (top and bottom, Figs. 1, 3, 4 and 5) with nasal and temporal positions of the lens reversed.

With continued reference to the drawings, wherein like characters are employed to designate like parts, the lens of this invention, indicated in its entirety by the numeral 8, comprises a skirt 9 having an endless rear edge or rim 10, and a lens proper, 12, integral with the front end 13 of the skirt, the entire structure forming a unique cup-shaped device that is approximately semi-elliptical in profile as seen in Fig. 1.

The material of the lens may be glass or any other suitable plastic, the only essential requisites being that it must have proper size and special shape and that its portion 12 must have optical properties for the correction of vision. The parts 9 and 12 may be of the same material or of two different materials, and in either event they may comprise elements separately formed initially and subsequently fused together along the line 13. The material or materials may be tinted and—the skirt in particular—may be colored in such manner that its presence cannot be detected in the eye of the wearer.

The skirt 9 preferably is made as thin as possible without rendering it too fragile, but its edge 10 must be blunt and smooth since it is designed to be pressed into the conjunctival fornix tissues of the eye-socket. Its contour is matched, by prescription, with the particular fornix conjunctivae of the individual patient. The entire skirt is of such size and shape as to clear the cornea entirely and to mount the lens proper 12, forwardly of the cornea.

Fig. 4 illustrates the correct mode of application of this lens to a human eye, comprising the eyeball 15 having the usual encased and sheathed vitreous center 16, with attached lower lid 17, merging nasally with flesh 18 of the nose. Ciliary muscles 19 and the adjacent ciliary process support the usual crystalline lens 20 and its iris 22. The circle of the fornix conjunctivae is indicated at 23 where it forms the line of fold or reflection for the conjunctival fornix membranes 24, which are mucous tissues that attach the eyelids to the eyeball. A normal, slightly bulging cornea is indicated at 25, which merges at the limbus 26 with the scleral sheath of the eyeball.

The skirt 9 of the fornix-supported lens 8 extends into the conjunctival sac formed by the conjunctival membranes 24 so that its rim is disposed behind the cornea 25, and the limbus 26 as well; and preferably, as shown, the rim goes all the way back to the conjunctival circle 23 so as to definitely position the skirt and thus accurately and securely mount the lens proper, 12. In fact the rim may press lightly against this circular line to stretch or distend the membranes 24 a little, without harm.

When the eyeball is rotated to focus here and there, the lens is moved to about the same extent, in degree and proportion, by the fornix conjunctivae, but without any possibility of contact between the cornea and the lens structure. Hence, optical correction is substantially perfect.

Thus the eyeball is relieved entirely of any support of the lens; it cannot be distorted or damaged by pressures and tensions such as those produced by true contact lenses; and it cannot even be irritated by light contact since the lens 12 does not touch the cornea in any position of the eyeball.

The clearances between the rear portion of the skirt 9 and the adjacent fornix membranes are somewhat exaggerated, as is also the waviness of the outlines of these membranes, for clarity of illustration.

In applying the device, it is held in cup fashion with the lens 12 at the bottom and filled, preferably, with a saline solution that may contain an emollient or other ingredients. Then, with head bowed so that the eyes are directed toward the floor and with the lids of one eye separated by the first two fingers or a finger and thumb of one hand, the rim of the device is slipped into position. During this operation the bulging cornea displaces some of the solution and, with it, any air bubbles that otherwise might have been trapped at the level of the rim. The lens now fits snugly and is sealed by way of the fornix conjunctivae so that no air can gain access.

It should be added here that the cup-shaped device of this invention may prove very useful to the medical profession as an internal eye-cup providing a means for applying special solutions to the eyeball for prolonged treatment in cases where a quick-wash would be of but small benefit. When thus used the part 12 need have no correctional properties nor even be transparent.

Fig. 5 illustrates a special application to an abnormal eyeball having an enlarged protruding cornea 27 and a limbus 28. A lens structure 29, modified to suit this condition, comprises a lens proper, 30, joined integrally to a skirt 32 that has its curved wall widened, between the rim and the lens proper, so that the latter is disposed farther to the front of the eyeball than is the lens 12 of Fig. 4. Thus a clearance is maintained between the protruding cornea, and the lens, without contact even when the eyeball is rolled, inasmuch as the moving eyeball transmits its movement through the conjunctivae fornix which in turn moves the lens with it to approximately the same degree. Due to this simultaneous but independent movement of the eyeball and lens structure, the lens proper need not fit the cornea as closely as would otherwise be necessary, and hence the lens structure is practically invisible to one gazing into the eyes of the wearer. In this and other respects this modification follows the same pattern as the invention disclosed in Fig. 4.

It is understood, of course, that other changes may be made within the spirit of the present invention and within the scope of the appended claims.

What is claimed is:

1. An optical lens structure comprising a skirt shaped to conform to and enter the conjunctival sac of the eye and to rest lightly against the conjunctival membranes thereof, said skirt being everywhere of sufficient internal size to clear the cornea and its surrounding limbus and at least the major surface areas of the scleral tissues of the eyeball, and a lens proper carried by said skirt for disposition in front of the cornea in spaced relation thereto.

2. In the lens structure set forth in claim 1, said skirt having a rim of such shape as to distend the conjunctival tissues slightly rearwardly in the region of the circle of fornix conjunctivae.

3. A device of the class described, comprising a cup-shaped member consisting of a substantially hemispherically curved transparent element having an integral rearwardly extending thin-walled skirt of approximately the shape of the internal surfaces of the eyelids of an open eye, said skirt formed to force the edges of the eyelids outwardly from the adjacent scleral tissues of the eyeball to such extent as to create a clearance between said member and the limbus and having a rim edge shaped complemental to the so-called circle of fornix conjunctivae, and said transparent member having an internal size substantially greater than the external size of the eyeball so as to fully clear the latter.

4. A device of the class described, comprising a thin cup-shaped member having a rim formed to fit the conjunctival fold of the eye and comprising: a portion adapted to fully enter the temporal end of the conjunctival sac, and an approximately semi-circular portion adapted to fully enter the nasal end of the said sac, these portions being continuous and shaped to entirely clear the eyeball proper.

5. A device of the class described, comprising an impervious cup of such internal depth and size as to form a cavity greater all over than the outer surface of the eyeball which it is intended to freely encase, the rim of said cup having a contour closely approximating that of the circle of fornix conjunctivae and shaped for support by the conjunctival fold without discomfort, whereby the cup may be filled with a solution and applied to the eye without pressure against the eyeball and without subsequent escape of the solution.

6. An internal elevated lens structure comprising a supporting rim and an approximately centrally located lens proper attached thereto, said rim and lens formed and arranged to have substantial clearance relative to the cornea and its surrounding portions of the eyeball, and said rim being shaped to enter the conjunctival fold to derive its main support therefrom, whereby there is no forceful pressure exerted by the rim against the eyeball and whereby said rim is not moved by contact with the eyeball.

7. An internal elevated lens structure comprising a cup having a cavity shaped generally to conform to that part of the eyeball which extends forwardly from the region of the circle of fornix conjunctivae but of sufficient size to substantially clear all of said part of the eyeball, the rim of said cup formed to fit within the conjunctival fold and derive its chief support therefrom, whereby movement of the lens structure is caused wholly by changes in shape of the conjunctival fold and its associated muscles and in that sense is independent of the eyeball.

8. An internal elevated lens structure comprising a frontal lens portion having an integral supporting portion, said supporting portion formed to extend directly back into the bottom of the conjunctival sac for carriage and for maintenance of position by the latter, both of said portions having clearance with respect to the eyeball proper, whereby the eyeball is neither compressed nor otherwise physically affected by the lens structure and may partake of free movement independently of said lens structure.

9. In the structure defined in claim 8, said supporting portion having a continuous edge approximately coextensive with the circle of fornix conjunctivae, and shaped to contact the latter sufficiently to definitely cause positioning of said structure entirely by the conjunctival fold.

JOHN H. LAWLOR.
EMIL DANZ.